(12) United States Patent
Claybrough et al.

(10) Patent No.: US 10,235,891 B2
(45) Date of Patent: Mar. 19, 2019

(54) METHOD AND DEVICE FOR DISPLAYING VERTICAL CONSTRAINTS OF AN AIRCRAFT, ASSOCIATED COMPUTER PROGRAM PRODUCT AND AIRCRAFT

(71) Applicant: THALES, Courbevoie (FR)

(72) Inventors: Matthieu Claybrough, Toulouse (FR); Bruno Aymeric, Le Haillan (FR); Sylvain Lissajoux, Toulouse (FR)

(73) Assignee: Thales, Courbevoie (FR)

( * ) Notice: Subject to any disclaimer, the term of this patent is extended or adjusted under 35 U.S.C. 154(b) by 152 days.

(21) Appl. No.: 15/201,258

(22) Filed: Jul. 1, 2016

(65) Prior Publication Data

US 2017/0004713 A1   Jan. 5, 2017

(30) Foreign Application Priority Data

Jul. 3, 2015   (FR) ...................................... 15 01417

(51) Int. Cl.
| | | |
|---|---|---|
| *G08G 5/00* | (2006.01) | |
| *G02B 27/01* | (2006.01) | |
| *G01C 21/20* | (2006.01) | |
| *G01C 23/00* | (2006.01) | |

(52) U.S. Cl.
CPC ........... *G08G 5/0065* (2013.01); *G01C 21/20* (2013.01); *G01C 23/00* (2013.01); *G02B 27/0101* (2013.01); *G02B 2027/0141* (2013.01); *G02B 2027/0183* (2013.01)

(58) Field of Classification Search
CPC .............. G08G 5/0065; G02B 27/0101; G02B 2027/0141; G02B 2027/0183; G01C 21/20; G01C 23/00; B64D 43/00; G06F 3/14

USPC ...................................................... 701/3–5, 14
See application file for complete search history.

(56) References Cited

U.S. PATENT DOCUMENTS

| | | | | |
|---|---|---|---|---|
| 6,112,141 | A | * 8/2000 | Briffe | .................... G01C 23/00 345/1.3 |
| 8,892,275 | B2 | * 11/2014 | Constans | ............... G08G 5/025 701/4 |
| 2006/0004496 | A1 | 1/2006 | Tucker et al. | |
| 2014/0067171 | A1 | 3/2014 | Kashi et al. | |
| 2014/0343763 | A1 | * 11/2014 | Koebel | .................. B64D 45/00 701/14 |
| 2015/0120100 | A1 | 4/2015 | Sacle et al. | |

OTHER PUBLICATIONS

French Search Report dated May 10, 2016 for French Patent Application 1501417.

* cited by examiner

*Primary Examiner* — Nga X Nguyen
(74) *Attorney, Agent, or Firm* — Knobbe, Martens, Olson & Bear, LLP

(57) ABSTRACT

A method and device for displaying vertical constraints of an aircraft, an associated program produce and aircraft are disclosed. In one aspect, the vertical constrains are displayed on a display device of the aircraft, the display device being part of an aircraft piloting system, the method being implemented by an electronic device that is part of the aircraft piloting system. The method includes acquiring at least one vertical constraint of the aircraft, computing a representative slope value associated with the vertical constraint, and displaying a symbol depicting the vertical constraint at the representative slope value associated with the vertical constraint on a slope scale.

14 Claims, 4 Drawing Sheets

METHOD AND DEVICE FOR DISPLAYING VERTICAL CONSTRAINTS OF AN AIRCRAFT, ASSOCIATED COMPUTER PROGRAM PRODUCT AND AIRCRAFT

CROSS-REFERENCE TO RELATED APPLICATION(S)

This patent application claims the benefit under 35 U.S.C. § 119 of French Application No. FR 15 01417 filed on Jul. 3, 2015 which is hereby incorporated by reference in its entirety.

BACKGROUND

Technological Field

The described technology falls within the field of avionics, and more particularly in the field of managing the piloting of an aircraft.

Description of the Related Technology

The described technology relates to a method for displaying vertical constraints of an aircraft on a display device of the aircraft, that is part of an aircraft piloting system. It also relates to an aircraft piloting system, and an associated computer program product and aircraft.

At this time, aircraft are commonly equipped with flight management systems (FMS). An FMS is able to collect data from the onboard systems and ground control systems with which the aircraft is in communication, and to provide information for piloting of the aircraft based on various outside constraints and performance of the aircraft. An FMS is also able to automate part of the conduct of the aircraft and to provide displays, for the display device of the aircraft piloting system.

For example, the FMS is able to compute a vertical profile of the aircraft able to respect a maximum number of vertical constraints for a reference lateral trajectory, in particular established based on the flight plan of the aircraft.

However, various situations exist in which the aircraft does not follow the reference trajectory initially set out, for example for weather reasons or to comply with spacing constraints between aircraft, a change in procedure or runway, or a need to delay or move up the scheduled arrival of the aircraft.

In cases where the aircraft is forced to depart from the initial reference lateral trajectory, the FMS traditionally no longer provides automatic guidance and is no longer able to provide information to the crew relative to the vertical constraints to be respected, and in particular margins with respect to the performance of the aircraft.

Likewise, in cases where the aircraft is forced to depart from the initial reference vertical trajectory, for example if it is descending and is not authorized to descend, the crew does not have information regarding the margins with respect to the performance of the aircraft that it has to respect the future vertical constraints.

SUMMARY OF CERTAIN INVENTIVE ASPECTS

One objective of the present disclosure is to improve the piloting system by providing a depiction of the vertical constraints of the aircraft, irrespective of whether the initial reference trajectory is followed.

To that end, the described technology relates to a method for displaying vertical constraints of an aircraft on a display device of the aircraft, that is part of an aircraft piloting system, implemented by an electronic device that is part of the piloting system. This method can comprises the following steps:

acquiring at least one vertical constraints of the aircraft,
computing a representative slope value associated with the vertical constraint,
displaying a symbol depicting the vertical constraint at the representative slope value associated with the vertical constraint on a slope scale.

Advantageously, the described technology proposes a depiction of vertical slope constraints based on performance characteristics of the aircraft. This depiction allows the piloting crew to easily understand the current situation of the aircraft relative to the depicted vertical constraints, the margins relative to the current guidance and relative to the performance of the aircraft.

The described technology is particularly applicable for taking vertical constraints of the aircraft into account.

The method according to the described technology may also have one or more of the following features, according to any technically possible combinations.

The slope scale is a performance scale, the method further comprising displaying the performance scale comprising a minimum slope value and a maximum slope value achievable by the aircraft, computed based on at least one performance characteristic of the aircraft, the computation of the representative slope value associated with the vertical constraint also depending on at least one performance characteristic of the aircraft.

The method includes computing a minimum performance trajectory and a maximum performance trajectory based on at least one performance characteristic of the aircraft, the representative minimum slope value being equal to the slope value of the tangent to the minimum performance trajectory relative to an artificial horizon line of the aircraft, the representative maximum slope value being equal to the slope value of the tangent to the maximum performance trajectory relative to an artificial horizon line of the aircraft.

The method further includes displaying a symbol indicating the current slope or the current vertical speed of the aircraft, the symbol being depicted with respect to the slope scale.

It also includes displaying a current guidance setpoint of the aircraft, the current guidance setpoint being shown with respect to the slope scale.

The method includes acquiring flight parameters of the aircraft comprising a vertical speed of the aircraft, a ground speed of the aircraft, a current altitude of the aircraft, a current slope of the aircraft and an airspeed, a vertical constraint being defined by an altitude, and the representative slope value associated with the vertical constraint being obtained as a mathematical formula based on at least two parameters from among the altitude of the vertical constraint and the flight parameters of the aircraft.

The step for computing a representative slope value associated with the vertical constraint includes assessing a slope value of a tangent at a predetermined distance from the current position of the aircraft of a boundary trajectory, the boundary trajectory being a trajectory making it possible to meet the vertical constraint according to a predetermined satisfaction criterion.

When the vertical constraint is an altitude constraint, the satisfaction criterion for the vertical constraint is an altitude difference, the altitude difference being the difference between an altitude value of the constraint at a passage point defined by ground coordinates and an altitude value provided by the boundary trajectory of the aircraft at the passage point.

The computation of a representative slope value takes a horizontal distance at a passage point associated with the constraint into account.

The horizontal distance is computed based on a lateral trajectory followed by the aircraft or based on a reference trajectory of the aircraft.

The horizontal distance is the shortest horizontal distance from a zone where the constraint applies.

The method includes computing a minimum performance trajectory and a maximum performance trajectory based on at least one performance characteristic of the aircraft, and the computation of a representative slope value includes a determination step making it possible to determine whether the vertical constraint belongs to an achievable flight envelope defined by the minimum performance trajectory and maximum performance trajectory.

If the vertical constraint belongs to the achievable flight envelope, the representative slope value is a propagator setpoint value for at least one guidance mode from among a vertical speed control mode and a slope control mode of the aircraft, allowing the aircraft to respect the vertical constraint.

If the vertical constraint does not belong to the achievable flight envelope, the representative slope value is computed based on an extrapolated boundary trajectory of the aircraft.

The vertical constraint is chosen from among a minimum altitude, slope or vertical speed limit and a maximum altitude, slope or vertical speed limit, and for a vertical constraint, the depiction symbol is chosen so as to be representative of a type of vertical constraint from among a minimum limit and a maximum limit.

According to one alternative, the depiction symbol has a shape representative of a vertical constraint source, and a size or opacity representative of the distance between the current position of the aircraft and a zone where the vertical constraint applies.

The method includes a step for selecting vertical constraints to be displayed, the selection taking into account at least one parameter from among a distance parameter of the aircraft from the vertical constraint, a priority parameter relative to a source of the vertical constraint, and a parameter representative of the slope associated with the vertical constraint.

According to a second aspect, the described technology relates to a system for displaying vertical constraints of an aircraft on a display device of the aircraft, that is part of an aircraft piloting system, implemented by an electronic device that is part of the piloting system. This system can comprise:

a module for acquiring at least one vertical constraints of the aircraft, a module for computing a representative slope value associated with the vertical constraint, a module for displaying a symbol depicting the vertical constraint at the representative slope value associated with the vertical constraint on a slope scale.

According to a third aspect, the described technology relates to a computer program product comprising software instructions which, when they are implemented by a computer, carry out a method for displaying vertical constraints of an aircraft on a display device of the aircraft as briefly described above.

According to a fourth aspect, the described technology relates to an aircraft comprising a piloting system comprising a display device, wherein the piloting system implements a vertical constraint display system as briefly described above.

BRIEF DESCRIPTION OF THE DRAWINGS

Other features and advantages of the described technology will emerge from the description thereof provided below, solely for information and non-limitingly, in reference to the appended figures, in which.

DETAILED DESCRIPTION OF CERTAIN INVENTIVE EMBODIMENTS

The described technology is described below as it applies to assistance in guiding an aircraft by depicting, on a primary flight display (PFD, also called Heads Up Display (HUD)), vertical constraints currently or imminently applicable to the aircraft.

A constraint is said to be applicable when it must be respected at the current moment. The applicable or imminently applicable constraints are those which are on or near the trajectory that the aircraft will be following. Only these constraints are displayed; in other words, constraints that are not applicable or imminently applicable in light of the trajectory currently followed by the aircraft are not displayed.

In general, a vertical constraint is defined by a window or range of altitude, slope or vertical speed values that the aircraft must respect.

Optionally, lateral constraints are also defined, in addition to vertical constraints, defining a flight volume or corridor of the aircraft.

Figure 1:
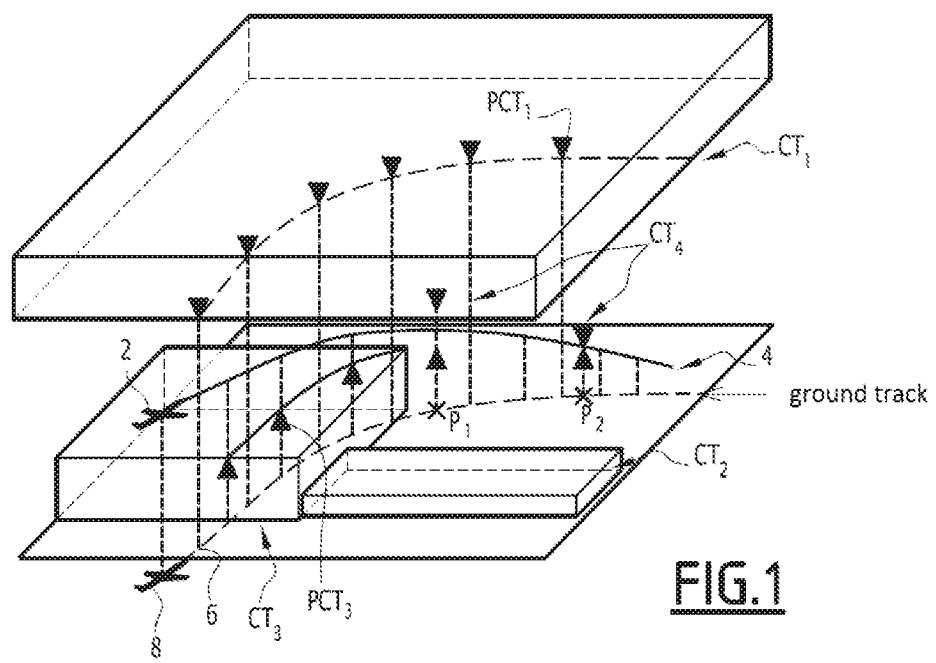
FIG. 1 scalematically shows an aircraft trajectory and examples of vertical constraints to be satisfied.

FIG. 1 scalematically shows an aircraft 2 and an anticipated trajectory 4, as well as a ground track 6 of the anticipated trajectory, relative to the ground projection of the aircraft 8.

Vertical constraints from various sources may apply for a given aircraft, over a given trajectory portion.

In the example shown in FIG. 1, a first constraint CT1 defines a flight volume or level prohibited to the aircraft. This type of constraint defines an altitude range, without lateral limits, prohibited to the aircraft, for example to avoid any collision risk. These are temporary constraints, required by ground control systems, for example an air traffic control (ATC) body. The constraint CT1 defines an altitude that must not be exceeded, therefore a maximum altitude limit constraint, called BELOW constraint (the altitude of the aircraft must be lower than or equal to the indicated maximum altitude). For ease of understanding, the constraint CT1 is illustrated in FIG. 1 by a set of points $P_{CT1}$, depicted by arrows that point toward the ground.

A second example constraint is the second constraint CT2, which defines a prohibited volume relative to the ground, for example due to the relief or the presence of equipment subject to overflight regulations, which is a permanent constraint. This type of constraint imposes a minimum altitude at each point, and is a minimum altitude limit constraint, called ABOVE constraint, for which the altitude of the aircraft must be greater than or equal to the indicated altitude.

A third example constraint is the third constraint CT3, imposed via flight indications or NOTAM (Notice to Airmen), for example imposed for weather reasons. In the example of FIG. 1, the constraint CT3 imposes minimum altitudes, and is therefore a so-called ABOVE constraint. For ease of understanding, the constraint CT3 is illustrated in FIG. 1 by a set of points $P_{CT3}$, depicted by arrows that point away from the ground and indicate a minimum altitude.

Furthermore, fourth constraints CT4, called procedural constraints, associated with the flight plan of the aircraft are also shown. The flight plan includes a set of waypoints on the ground geo-referenced by their latitude and longitude coordinates in an earth reference. Given waypoints have one or more associated vertical constraints, which may be minimum altitude ABOVE, maximum altitude BELOW, altitude to be respected AT, or altitude window WINDOW constraints. In the example of FIG. 1, at the way point $P_1$, the procedural constraint is a WINDOW constraint, while at the waypoint $P_2$, the procedural constraint is an AT constraint.

In summary, when the constraint only defines a minimum altitude limit (ABOVE), the range of authorized altitude values corresponds to values above the given minimum altitude.

When the constraint only defines a maximum altitude limit (BELOW), the range of authorized altitude values corresponds to values below the given maximum altitude.

When the constraint is AT, the range of authorized altitude values is reduced to one point, which corresponds to the value of the indicated altitude constraint.

Lastly, when the constraint is WINDOW, the range of authorized altitude values corresponds to the set of altitude values comprised between the minimum altitude value and the maximum altitude value defined by the constraint.

A fifth example constraint, not shown, is a vertical constraint originating from a system protecting against outside threats, such as traffic or the weather. For example, a collision detection and avoidance system TCAS detects collision risks with other aircraft and translates them into constraints to be respected; this may in particular involve a vertical speed constraint, for example imposing a vertical speed greater than or equal to 1500 feet per minute. Also for example, a terrain collision avoidance system TAWS issues an alert that may be translated into a slope constraint, for example indicating taking a slope greater than or equal to 3°.

Aside from the constraints illustrated in FIG. 1, there are volume constraints, indicating a predefined flight volume or corridor, for example a geo-referenced trajectory with which a maximum lateral and vertical deviation is associated. For example, the volume imposed by such a constraint may be defined by a tube with a variable rectangular or elliptical section.

Nominal procedural constraints of the aircraft also exist, for example constraints defined by a minimum or maximum slope to be respected upon takeoff, landing or during a flight level transition, or in a failure situation, for example a BELOW constraint following a depressurization.

Each vertical constraint is represented by a limited number of parameters:
the direction of the constraint: ABOVE or BELOW;
the type of constraint: altitude constraint, slope constraint, vertical speed constraint.

A WINDOW or AT constraint will be broken down into two ABOVE and BELOW constraints.

A vertical constraint may be expressed in altitude, vertical speed or slope.

Subsequently, the slope depiction on a performance scale of the vertical constraints is outlined, but this slope depiction may be done on any other scale, such as a compliant vertical speed slope scale or a graduated attitude slope scale, or independently of any scale.

A compliant vertical speed scale is a scale indicating compliant vertical speed graduations in slope, i.e., the graduation corresponding to a vertical speed VZ is displayed at the associated slope FPA.

The characteristic vertical speed VZ, longitudinal speed GSPD (or ground speed) and angle values characterizing the slope FPA are linked by the following equation:

$$FPA = \text{ATAN}\left(\frac{VZ}{GSPD}\right) \quad (1)$$

where GSPD represents a longitudinal speed in a longitudinal direction X perpendicular to the vertical direction Z, and ATAN( ) represents the arctangent function.

A slope graduated attitude scale is known by those skilled in the art and is used to indicate the attitude of the aircraft, by reading the position of the airplane model symbol with respect to the slope graduated scale. Desirably, the display of the slope depiction and the associated slope scale is done on a screen of the PFD and/or HUD type.

Figure 2:
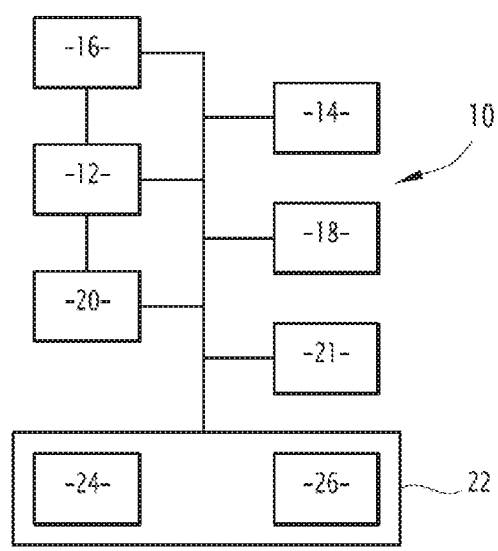
FIG. 2 is a block scale of the main modules of an aircraft piloting system in one embodiment of the described technology.

FIG. 2 scalematically illustrates an aircraft piloting system 10, according to one embodiment.

The piloting system 10 comprises a guidance system of the aircraft 12, able to receive data from a set of sensors 14 and send commands to the control systems 16 of the aircraft.

The set of sensors 14 comprises, in a known manner, global positioning system (GPS) geolocation data sensors, altitude, speed, acceleration, etc. sensors providing useful data for the piloting of the aircraft.

The control systems 16 of the aircraft in particular comprise elevators and rudders, an engine control unit (ECU), an aerodynamic braking control system, etc.

The aircraft guidance system 12 makes it possible, via its action on all of the control systems of the aircraft, to cause a change in attitude of the aircraft.

The guidance system of the aircraft 12 is, for example, an automatic pilot device, also called auto-flight control system (AFCS), also called automatic pilot (AP).

The piloting system 10 also comprises a radio link communication system 18, called DATALINK, with air traffic control systems on the ground of the ATC type, able to provide the aircraft with information from the ground or from other aircraft in real time.

For example, specific information relative to weather conditions, imposing new vertical constraints that may result in a change of trajectory of the aircraft, is sent via the communication system 18.

The piloting system also comprises a flight management system 20 (FMS), connected with the guidance system of the aircraft 12 and with man-machine interfaces 22, in particular comprising one or several display devices 24 making it possible to display various information useful for the piloting team, and in particular the applicable and imminently applicable vertical constraints originating from a flight management system 20 according to one embodiment of the described technology.

Alternatively or additionally, the vertical constraints are received from monitoring systems 21 of the SWS, TCAS or TAWS type (protection from stalling, traffic and terrain, respectively), or via communication 18 by radio link DATA-LINK.

Furthermore, other man-machine interfaces 26 comprise keyboards, buttons, and more generally, one or more means allowing a pilot to interact to modify the displays or to select or modify the guidance setpoint of the aircraft.

The display devices 24 comprise one or several display monitors for example located on a dashboard of the aircraft, also called "primary displays", on the one hand, and one or several display monitors of the HUD or head up display type, making it possible to display data superimposed on a pilot's field of view, desirably at the windshield of the cockpit, on the other hand. For example, an HUD display is done on a transparent display screen, positioned between the pilot's position and the windshield of the cockpit, in the pilot's viewing direction.

Alternatively, the HUD display is done on a monitor situated in front of one or both of the pilot's eyes and fastened to the pilot's head via a helmet or goggles. Advantageously, the HUD display device provides a synthetic depiction of the terrain of the Synthetic Vision System (SVS) type.

Any alternative embodiment of a HUD display monitor within the reach of one skilled in the art may be considered.

The flight management system 20 is desirably implemented by a computer comprising one or several processors, able to run computations and computer program code instructions when they are powered on.

The set of sensors 14 is suitable for measuring speeds and accelerations of the aircraft, in particular a vertical speed VZ in a vertical direction Z, i.e., a direction normal to the land surface.

Several guidance modes of the aircraft may be considered, comprising a first vertical speed control mode, referred to as vertical speed (VS) mode, a second slope control mode of the aircraft, known as flight path angle (FPA) mode, a third fixed engine adjustment climb mode, referred to as CLB (CLIMB), and a fourth fixed engine adjustment descent mode, known as DES (DESCENT) mode. The adjustment of the engine for example pertains to its rating, its torque, or its fuel flow rate. The third and fourth modes are also called performance modes, since they make it possible to fully use the performance of the aircraft. The CLB mode is generally associated with full thrust, and the DES mode with minimal thrust.

Figure 3:
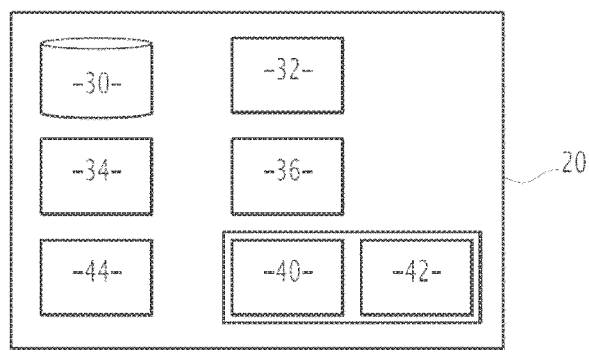
FIG. 3 is a block scale of the main modules of a flight management system in one embodiment of the described technology.

FIG. 3 scalematically shows the main functional modules implemented by a device able to carry out the described technology, in particular a flight management system 20 in the illustrated example.

Alternatively, the functional modules are implemented in the guidance system of the aircraft 12, in the man-machine interfaces 22, or in another independent electronic device including a computing capability.

The system 20 comprises a memory 30 able to store software program code instructions and information databases comprising flight parameter values.

The system 20 also comprises a module 32 for acquiring one or several vertical constraints, in particular vertical constraints as defined above, and a module 34 for selecting constraints to be displayed.

The module 34 is implemented optionally. According to one embodiment, all of the vertical constraints are displayed.

Furthermore, the system 20 comprises a module 36 for depicting the vertical constraints acquired by associated parameters.

For example, a WINDOW vertical constraint is depicted by two vertical constraints, an ABOVE constraint and a BELOW constraint.

A module 36 is able to compute a slope depiction value of each vertical constraint, desirably based on at least one performance characteristic of the aircraft, as explained in detail below.

Thus, whatever the initial expression of a vertical constraint, in slope, in vertical speed or in altitude, a depiction by a slope value is obtained.

The computation of a slope depiction value also, in some cases, takes the guidance mode of the aircraft into account. A representative slope value is associated with a vertical constraint, the representative slope value indicating a slope to be done by the aircraft to satisfy the vertical constraint.

For example, a representative slope value is an angular value or an altitude difference percentage.

In the rest of the description, for simplification reasons, the term "slope value" will also be used to refer to the representative slope value defined above.

It should be noted that in the general case, several slope possibilities exist to comply with the given constraint. In the case of an ABOVE constraint (BELOW, respectively), a slope is desirably computed that makes it possible to go to the limit value, and therefore consequently to satisfy the constraint. However, all of the highest slopes (lowest, respectively) also make it possible to satisfy the constraint.

In one embodiment, in the case where the vertical constraint is an altitude constraint, the module 36 includes a sub-module 40 able to compute minimum and maximum slope values based on the performance of the aircraft and to define an achievable flight envelope, and a module 42 for computing a slope value associated with a boundary trajectory of the aircraft making it possible to achieve a vertical constraint, as explained in more detail below.

A module 38 determines the depiction of each vertical constraint and, optionally, a guidance setpoint of the aircraft based on a guidance mode, according to a performance scale, defined by minimum and maximum slope values achievable by the aircraft based on at least one performance characteristic of the aircraft.

The system 20 further includes a display module 44 able to display, on one of the display monitors 24, information determined by the module 38, in particular one or several symbols depicting the vertical slope constraints and, optionally, the performance scale, and a current guidance setpoint of the aircraft, indicating the current slope or vertical speed setpoint of the aircraft in the current guidance mode, as well as the current slope or vertical speed value of the aircraft.

Advantageously, the pilot may easily understand, by observing this display, the current situation of the aircraft relative to one or more vertical constraints, the margins relative to the current guidance and the margins relative to the performance of the aircraft.

Figure 4:
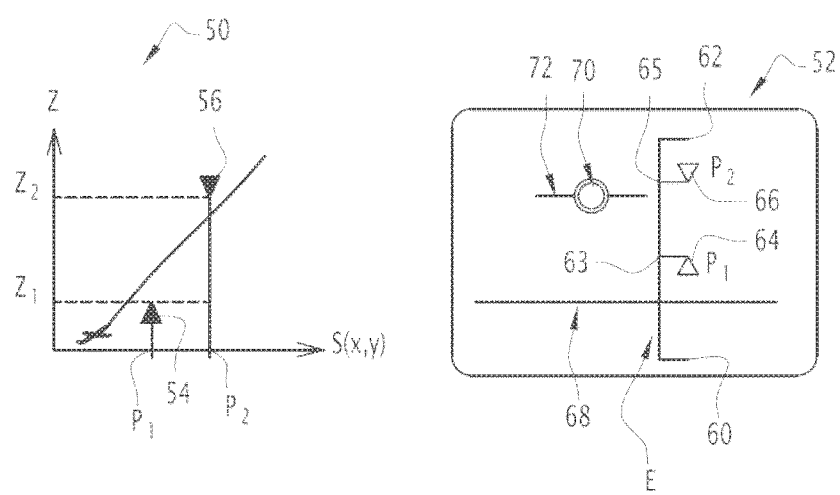
FIG. 4 is an example depiction of vertical constraints according to one embodiment of the described technology.

FIG. 4 shows a scalematic depiction 50 of two vertical constraints in profile view, and a scalematic depiction 52 of the same constraints according to the described technology, on a slope scale, representative of slope values associated with the constraints.

The scalematic depiction 50 illustrates, in a plane of reference, the vertical direction Z and a curvilinear x-axis S(x,y) along the lateral trajectory of the aircraft, a first vertical constraint at the geo-referenced point $P_1$, which is an ABOVE constraint, indicating that the aircraft must pass above an altitude $Z_1$ at the point $P_1$. The first vertical constraint is depicted by a triangle-shaped symbol 54 pointing upward.

A second vertical constraint indicates that the aircraft must pass below an altitude $Z_2$ at the geo-referenced point $P_2$, which is a BELOW constraint, depicted by a triangle-shaped symbol 56 pointing downward.

The scalematic depiction 52 according to the described technology also includes information relative to the same constraints at the geo-referenced points $P_1$, $P_2$, depicted in slope.

The constraints are depicted on a slope performance scale E, defined by extreme slope values 60, 62, respectively corresponding to a minimum slope value corresponding to a minimum performance of the aircraft and to a maximum value corresponding to a maximal performance of the aircraft.

For example, the slope value 62 is associated with a maximum thrust of the engines of the aircraft, and the slope value 60 is associated with a minimum thrust of the engines of the aircraft.

Alternatively, the extreme slope values correspond to the adjustment of the engines associated with the performance guidance modes.

For example, the engine adjustment associated with the CLB guidance mode is used to define the maximum slope value 62. For example, the engine adjustment associated with the DES mode is used to define the minimum slope value 60. This alternative makes it possible to take into account the minimum and maximum appropriate ratings computed based on flight conditions, for example taking into account the need for deicing.

Also alternatively, the extreme slope values may be associated, in addition to the engine adjustments defined above, with deployed or retracted states of aerodynamic surfaces such as air brakes, offset surfaces or landing gear. For example, the minimum performance slope 60 can be computed considering a minimum rating as well as a deployed state of the air brakes.

Any other known alternative for automatic computation based on capacities of the aircraft and flight conditions, using navigational instruments and sensors, making it possible to determine the maximum slope value associated with a maximum performance of the aircraft and a minimum slope value associated with a minimum performance of the aircraft, may be used.

The first constraint relative to the point $P_1$ and the second constraint relative to the point $P_2$ are depicted at slope values 63, 65 on the scale E, computed by the slope value determining module 36, and are depicted by respective triangular symbols 64, 66.

Desirably, each symbol 64, 66 indicates the direction of the vertical constraint by the direction in which the triangle points.

An artificial horizon line 68 is also shown relative to the performance scale E, corresponding to a zero slope and known by those skilled in the art.

The zero slope associated with the artificial horizon may be used as origin for the performance scale E.

In the example of FIG. 4, the two depicted constraints are situated above the artificial horizon line 68, indicating that the two constraints are above the aircraft.

A current guidance setpoint 70 of the aircraft relative to the current guidance mode is displayed, as well as the current slope value of the aircraft 72.

Alternatively or additionally, the current vertical speed of the aircraft is displayed at a corresponding slope value.

For example, the current guidance setpoint 70 corresponds to a VS mode setpoint and is representative of a setpoint speed vector of the aircraft.

When the symbol associated with the constraint is below the depiction of the current guidance setpoint 70, this means that maintaining the current guidance setpoint allows the aircraft to pass above the constraint. In the example of FIG. 4, the first vertical constraint, depicted by the symbol 64, will be respected with the current guidance setpoint 70.

When the symbol associated with the constraint is above the depiction of the current guidance setpoint 70, this means that maintaining the current guidance setpoint allows the aircraft to pass below the constraint. In the example of FIG. 4, the second vertical constraint, depicted by the symbol 66, will be respected with the current guidance setpoint 70.

The depiction 52 advantageously makes it possible to view the performance margins of the aircraft. For example, the margins to respect a future ABOVE or BELOW constraint with respect to the extreme performance 62, 60 of the aircraft are simply depicted by the deviation, on the performance scale E, between the slope values associated with the constraints and the extreme values.

If one of the future ABOVE (BELOW, respectively) constraints is aligned on the performance scale with an extreme value 62 (60, respectively), then no margin relative to the performance of the aircraft exists to hold that constraint.

If one of the ABOVE (BELOW, respectively) constraints exceeds the extreme value 62 (60, respectively), the given constraint may not be satisfied in light of the current performance of the aircraft. In such a case, a pilot alert may be given, the constraint being predicted to be MISSED. According to one embodiment, a visual alert is displayed on one of the displays 24, optionally accompanied by another type of alert, for example an audio alert. For example, the visual alert may be done by animating the signal depicting the constraint, this animation being able to be a blinking, an enlargement, a vibration, a color change, etc.

Furthermore, the deviation between the current slope value of the aircraft 72 and the slope value associated with a constraint indicates the margin relative to the current slope of the aircraft. Likewise, the deviation between the slope value of the current guidance setpoint 70 and the slope value associated with a constraint indicates the margin relative to the current guidance setpoint. This display more generally makes it possible to adjust a guidance setpoint or the current slope of the aircraft to satisfy one or more constraints.

For example, in the display 52, the current guidance setpoint 70 must be situated between the slope values 63 and 65 to respect the constraints associated with the points $P_1$ and $P_2$.

It should be noted that to satisfy an AT setpoint having an associated slope value, the guidance setpoint must be aligned with the slope value.

It is understood that the depiction 52 of the vertical constraints evolves dynamically as the aircraft approaches the points P1 and P2.

Aside from this information, according to one alternative, additional information is graphically indicated owing to the symbols associated with the constraints.

For example, the source of each vertical constraint may be indicated by an associated symbol.

In one non-limiting embodiment:

a triangle-shaped symbol, such as the symbols 64, 66 of FIG. 4, depicts a constraint associated with the flight plan;

an arrow-type symbol shows a vertical constraint associated with the relief;

a diamond-type symbol shows a vertical constraint associated with traffic;

a cloud-shaped symbol shows a vertical constraint due to weather conditions.

In general, any choice of symbol or color making it possible to contribute additional information relative to the source of each constraint is considered.

Additionally, it is also provided to indicate the spatial or temporal proximity of a constraint via visual information, for example the size of the symbol representing the constraint or a level of opacity applied to the symbol.

Thus, the display evolves dynamically and depends on a parameter representative of the distance between the aircraft and a constraint, whether it involves the distance or the time necessary to arrive above the points $P_1$, $P_2$, these points being geo-referenced on the ground.

Advantageously, this makes it possible to view the order relative to the constraints, allowing the pilot to determine the order in which the constraints must be satisfied.

Figure 5:
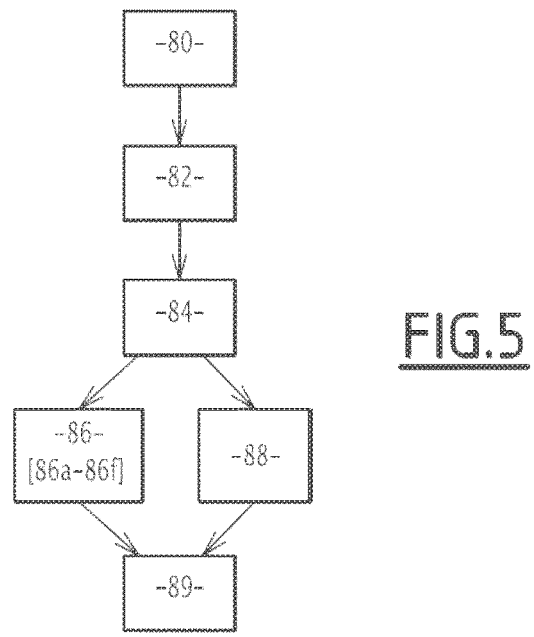
FIG. 5 is a flowchart illustrating the main steps for determining a slope depiction of a vertical constraint according to one embodiment of the described technology.

FIG. 5 is a flowchart illustrating the main steps of a method for computing a slope depiction value of each vertical constraint expressed in altitude according to one embodiment of the described technology.

The method is applied for a future vertical constraint, governing the passage of the aircraft in a defined zone from a geo-referenced point $P_i$, which is situated in front of the aircraft.

The method uses information or performance characteristics of the aircraft, originating from the set of sensors 14 and theoretical operating data stored beforehand (for example, performance tables) and information defining the vertical constraint.

The method comprises a step 80 for acquiring a vertical constraint C and determining values of the parameters to be used, comprising determining a horizontal distance relative to the vertical constraint C.

In general, flight parameters of the aircraft are also acquired comprising a vertical speed of the aircraft, a ground speed of the aircraft, a current altitude of the aircraft, a current slope of the aircraft and an airspeed.

The horizontal distance Dc is desirably the distance to a zone where the constraint C applies along the lateral trajectory followed by the aircraft.

Alternatively, the horizontal distance is the shortest distance between the aircraft and the zone where the constraint applies.

According to another alternative, the horizontal distance Dc is the distance to the zone where the constraint C applies along another lateral trajectory, for example the reference lateral trajectory defined by the flight plan.

Furthermore, the speed profile of the aircraft to be used is determined in step 80.

Desirably, the speed profile is a constant speed profile and equal to the current setpoint speed of the aircraft.

According to one alternative, the speed profile is a constant speed profile and equal to the current measured speed of the aircraft.

According to another alternative, the speed profile is another speed profile, for example the speed profile associated with the reference trajectory defined by the flight plan.

The step 80 for determining the values of the parameters is followed by a step 82 for computing maximum and minimum performance trajectories respectively corresponding to a maximum performance of the aircraft for a given state of the aircraft (speed, configuration, etc.) and a minimum performance of the aircraft for a given state of the aircraft based on the data provided by the set of sensors and onboard instruments, and theoretical models or performance tables of the aircraft stored beforehand.

This computation of minimum and maximum performance trajectories is desirably done by propagators that simulate, from a propagator setpoint value supplied as input, the use of vertical guidance modes of the aircraft, in particular the VS, FPA, CLB and DES modes, according to the known methods, and will not be described in more detail here.

The representative maximum slope value MAX, corresponding to the slope value 62 of FIG. 4, associated with the performance scale E, is selected as the slope value of the tangent to the maximum trajectory at the current position of the aircraft or to a predetermined distance from the current position of the aircraft.

The representative minimum slope value MIN, corresponding to the slope value 60 of FIG. 4, associated with the performance scale E, is selected as the slope value of the tangent to the minimum trajectory at the current position of the aircraft or to a predetermined distance from the current position of the aircraft.

Figure 6:
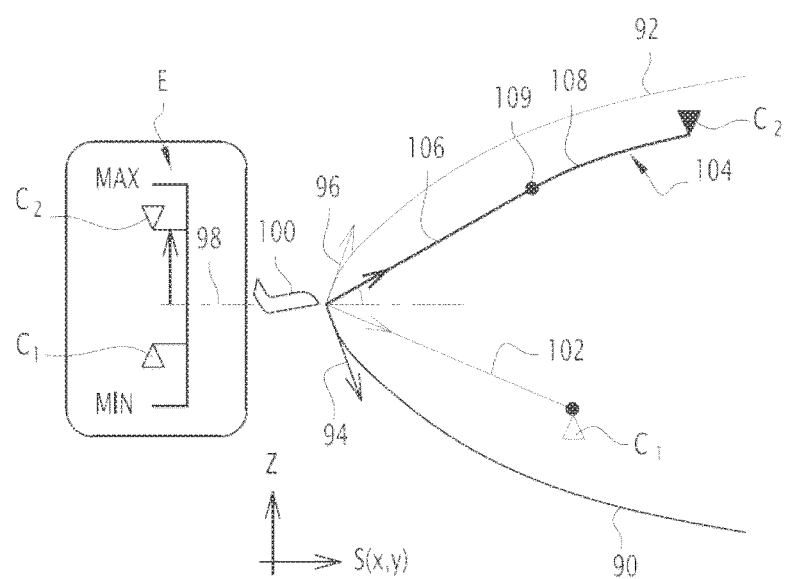
FIGS. 6 and 7 scalematically illustrate aircraft trajectories and an associated slope depiction.
Figure 7:
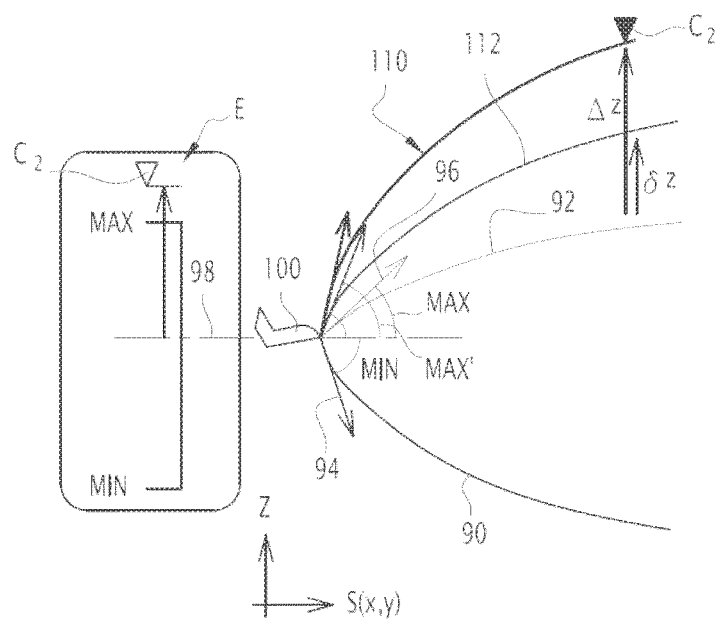

FIGS. 6 and 7 scalematically illustrate minimum performance trajectory 90 and maximum performance trajectory 92 examples, with respective tangents 94 and 96.

The MAX and MIN representative respective slope values correspond to the slopes of the tangents 94, 96 relative to the artificial horizon line 98. These characteristic slope values are desirably angular values.

Returning to FIG. 5, the step 82 for computing minimum and maximum trajectories and the corresponding extreme slope values is followed by a plurality of steps for determining the representative slope value of a limit trajectory associated with the vertical constraint in question.

The step 84 for determining the envelope of the vertical constraint C consists of determining whether the vertical constraint C belongs to the achievable flight envelope, which is the envelope defined by the maximum and minimum limit trajectories previously computed.

For example, in FIG. 6, the two constraints C1 and C2 are both in the achievable flight envelope.

In the example of FIG. 7, the constraint C2 is outside the achievable flight envelope, the altitude of the constraint Z_C2 being greater than the maximum achievable altitude in the application zone of the constraint.

A slope associated with a trajectory associated with the constraint, called limit trajectory associated with the constraint, will be computed in steps 86 and 88, described in detail below.

The limit trajectory associated with a vertical constraint C refers to a trajectory starting from the aircraft and exactly achieving the constraint, therefore passing through an altitude point Z_C above the geo-referenced waypoint P.

Three types of boundary trajectories are distinguished, depending on the scenario:

direct boundary trajectory, compatible with the performance of the aircraft, computed by setting a constant flight parameter from among the vertical speed and the slope. The direct boundary trajectory is a prediction of the trajectory that would be flown using the corresponding guidance mode (VS or FPA) of a guidance system of the aircraft;

saturated boundary trajectory, compatible with the performance of the aircraft, made up of two portions each having a constant flight parameter from among the vertical speed, the slope, and the engine adjustment. Typically, the constant parameter of the first portion will be the vertical speed or the slope, and the constant parameter for the second portion will be an engine adjustment. The saturated boundary trajectory is a prediction of the trajectory that would be flown using the corresponding guidance modes (VS, FPA, CLB or DES) of the guidance system of the aircraft.

extrapolated boundary trajectory, computed when no direct boundary trajectory or saturated boundary trajectory compatible with the performance of the aircraft exists.

FIG. 6 shows a direct boundary trajectory 102 associated with the constraint C1, and a saturated boundary trajectory 104 associated with the constraint C2, having a first portion 106 and a second portion 108, joined at a point 109.

In FIG. 7, an extrapolated boundary trajectory 110, making it possible to achieve the constraint C2 but outside the achievable flight envelope, is illustrated.

Returning to FIG. 5, when the considered vertical constraint belongs to the achievable flight envelope, the step 84 is followed by a step 86 for determining a slope value of a boundary trajectory associated with the vertical constraint, which is a direct boundary trajectory or a saturated boundary trajectory.

Several embodiments of step 86 are considered.

According to a first embodiment, an approximation of the slope of a direct boundary trajectory is given by the following computation:

$$FPA\_C = ATAN\left(\frac{Z\_C - Z\_A}{Dc}\right) \quad (2)$$

Where FPA_C is the computed slope representative angular value, ATAN( ) is the arctangent function, Z_C is the altitude associated with the constraint C, Z_A is the current altitude of the aircraft and Dc is the horizontal distance defined in step 80.

It should be noted that FPA_C is the slope of the line passing through the points Z_C and Z_A. Yet an aircraft generally does not have a straight trajectory, but rather a parabolic trajectory.

According to one alternative, an iterative algorithm seeking a representative slope value by dichotomy, comprising steps 86a to 86f, is carried out.

During a first step 86a, a search interval [a,b], a and b being slope values, is initialized as follows.

If the altitude of the constraint is above the altitude of the aircraft, [a, b]=[0,MAX];

If the altitude of the constraint is below the altitude of the aircraft, [a, b]=[MIN,0];

A parameter N representative of the number of iterations done is initialized at 0.

In the following step 86b, a representative slope value FPA_C is computed by:

$$FPA\_C = \frac{a+b}{2} \quad (3)$$

The parameter N is increased by 1.

Next, in step 86c, the parameter N is compared to a threshold CRIT_1 defining a maximum number of iterations to be done.

Desirably, CRIT_1 is computed during the first iteration using the formula:

$$CRIT\_1 = CEIL\left[\frac{\ln((b-a)/PRS)}{\ln(2)}\right] \quad (4)$$

Where CEIL[X] provides the rounding to the next highest integer of a real value X, ln( ) is the Napierian logarithm function, and PRS is the desired slope precision, desirably comprised between 0.01° and 0.2°. Alternatively, a fixed value, for example CRIT_1=10, is used.

If N is greater than CRIT_1, the iterations are stopped and the representative slope value associated with the constraint C is the value FPA_C.

In the following step 86d, the slope value FPA_C is used as setpoint value supplied as input of a propagator, able to compute a direct boundary trajectory or a saturated boundary trajectory $T_L$(FPA_C) from the initial slope value FPA_C.

It should be noted that when the propagator begins by simulating slope maintenance, i.e., in FPA mode, the slope value FPA_C is used as setpoint value.

When the propagator begins by simulating vertical speed maintenance, i.e., in VS mode, the setpoint value supplied at the input of a propagator is:

$$VZ\_C = \tan(FPA\_C) * GSPD\_M \quad (5)$$

Where tan( ) is the tangent function, GSPDM_M is the average ground speed of the aircraft over the distance Dc, for example computed exactly or as a weighted sum of the current ground speed of the aircraft and the estimated speed at the altitude of the constraint.

It should be noted that the propagator automatically switches from the VS or FPA mode to the CLB performance mode (when the constraint is above the horizon) or DES performance mode (when the constraint is below the horizon) when it reaches the aircraft performance limit, i.e., when the VS or FPA mode is no longer compatible with the performance of the aircraft.

Also advantageously, the choice of the initial VS or FPA mode for the propagator is made based on the engaged vertical mode, i.e., VS if the VS mode is engaged and FPA if the FPA mode is engaged. When neither of the VS and FPA modes are engaged, the operator chooses the initial mode based on the context, for example the VS mode in the climb, cruising and initial descent phase and the FPA mode in the approach phase.

Alternatively, the choice of the initial VS or FPA mode for the propagator is always made based on the context, for example the VS mode in the climb, cruising and initial descent phase and the FPA mode in the approach phase.

One then obtains an altitude value Z_Ap achieved by the propagator at the geo-referenced point P of the zone in which the constraint applies.

ΔZ designates the altitude difference between the altitude achieved by the propagator following the trajectory $T_L$(V_c) and the altitude associated with the constraint Z_C:

$$\Delta Z = Z\_Ap - Z\_C \quad (6)$$

In the comparison step 86e, the absolute value of ΔZ is compared to a predetermined threshold CRIT_2, which desirably assumes a value computed based on a desired slope precision PRS, for example comprised between 0.01° and 0.2°.

For example, $$CRIT\_2 = 0.5 * \tan(PRS) * Dc \quad (7)$$

Alternatively, a fixed value, for example CRIT_2=1 meter, is used.

If $|\Delta Z| < CRIT\_2$, the iterations are stopped.

The slope value associated with the constraint C is the value FPA_C.

Otherwise, the step 86e is followed by a step 86f for updating the search interval:

$$\text{if } \Delta Z > 0, [a,b] \leftarrow [a, FPA\_C] \quad (8)$$

$$\text{if } \Delta Z < 0, [a,b] \leftarrow [FPA\_C, b] \quad (9)$$

The algorithm returns to step 86b previously described, and steps 86b to 86f are iterated unless the number of iterations N is greater than CRIT_1.

When the considered vertical constraint does not belong to the achievable flight envelope, step 84 is followed by a step 88 for determining a slope value depending on an extrapolated boundary trajectory associated with the vertical constraint.

For example, a small speed variation dv is introduced, as illustrated in FIG. 7, which may be positive or negative.

FIG. 7 shows $\Delta Z$ the altitude difference between the altitude associated with the constraint C2 and the corresponding point of the maximum performance trajectory 92, at the reference speed, the corresponding point being at the vertical of the constraint.

When the reference speed is reduced, i.e., negative dv, the obtained maximum performance or best climb trajectory, denoted 112, rises above the maximum performance trajectory 92 at the reference speed. The slope of the tangent to the trajectory 112 is increased and becomes MAX'.

$\delta\gamma$ denotes the slope gain obtained with the variation dv of the speed:

$$\delta\gamma = MAX' - MAX \quad (10)$$

$\delta z$ is the corresponding altitude gain obtained, as illustrated in FIG. 7.

To obtain a better climb, a negative speed variation dv is chosen, since a speed decrease allows a better climb.

For example, the speed variation is −5 knots.

According to a first embodiment, with a fixed dv, $\delta\gamma$ and $\delta z$ are computed, then the slope value associated with the constraint:

$$\text{If } \Delta Z > 0, FPA\_C = MAX + \left(\frac{\delta\gamma}{\delta z}\right) * \Delta z \quad (11)$$

In this case, the slope value associated with the constraint C is greater than MAX.

$$\text{If } \Delta Z < 0, FPA\_C = MIN + \left(\frac{\delta\gamma}{\delta z}\right) * \Delta z \quad (12)$$

In this case, the slope value associated with the constraint C is less than MIN.

Other alternative embodiments of step 88 are considered.

According to a first alternative, the variation dv that makes it possible to pass through the constraint is computed, and the depiction slope of the constraint is then the slope of the tangent to the performance trajectory corresponding to the reference speed increased by dv. It should be noted that when the constraint is above the best climb trajectory, dv is negative.

The computation of the dv variation may be done by dichotomy or any other method from the state of the art.

According to a second alternative, a theoretical form of the performance trajectories is used. This second alternative embodiment is illustrated below with a theoretical climb performance trajectory, but other theoretical performance trajectories may be used. Furthermore, it is possible to consider using different trajectories for the climb or descent.

For example, a theoretical formula giving the altitude Z as a function of the horizontal distance x is:

$$Z(x) = S * A * \left(1 - \exp\left(-\frac{(x - x_0)}{B}\right)\right) \quad (13)$$

with:

Z(x) the altitude at the curvilinear x-axis x

S the scale factor, equal to 1 to have the true theoretical performance

A and B: coefficients of the theoretical curve able to depend on the speed, temperature, mass, winds, aircraft configuration, etc.

$x_0$ the initial condition.

By imposing the initial condition Z(0)=Zi with Zi the current altitude, one obtains:

$$x_0 = B * \ln\left(1 - \frac{Z_i}{S * A}\right) \quad (14)$$

One deduces from this:

$$Z(x) = S * A * \left(1 - \exp\left(-\frac{x}{B}\right) * \left(1 - \frac{Z_i}{S * A}\right)\right) \quad (15)$$

The initial slope is then obtained by derivation:

$$\frac{dZ}{dx}(0) = \left(\frac{S * A - Z_i}{B}\right) \quad (16)$$

Lastly, to compute the scale factor S making it possible to pass by an altitude constraint Zc and at a horizontal distance Dc, it suffices to write $Z(Dc) = Z_c$ to obtain:

$$S = \frac{1}{A} * \frac{(Z_c - Z_i \exp(-Dc/B))}{1 - \exp(-Dc/B)} \quad (17)$$

By replacing the initial slope in expression (16), one obtains:

$$\frac{dZ}{dx}(0) = \frac{(Z_c - Z_i)}{B * (1 - \exp(-Dc/B))} \quad (18)$$

Resulting in the final expression giving the slope FPA_C as a function of the different parameters described above:

$$FPA\_C = ATAN\left(\frac{(Z_c - Z_i)}{B*(1-\exp(-Dc/B))}\right) \quad (19)$$

With:
FPA_C the slope to display the constraint
Zc the altitude [of] the constraint
Zi the current altitude
Dc a horizontal distance from the constraint
B a coefficient of the curve, which may depend on the speed, temperature, mass, winds, aircraft configuration, etc.

The horizontal distance Dc is desirably the distance to a zone where the constraint C applies along the lateral trajectory followed by the aircraft. Alternatively, the horizontal distance is the shortest distance between the aircraft and the zone where the constraint applies. According to another alternative, the horizontal distance Dc is the distance to the zone where the constraint C applies along another lateral trajectory, for example the reference lateral trajectory defined by the flight plan.

Steps 80 to 88 are repeated for each vertical constraint expressed in altitude at a given computation frequency, chosen as a function of computation constraints and fluidity objectives of the display, for example 10 Hz.

Steps 80 to 88 have been described for the vertical constraints expressed in altitude.

The next part of the method also applies for vertical constraints expressed in slope and vertical speed.

Thus, when the vertical constraint is expressed in slope, the slope value at which the depiction symbol for the constraint is displayed is that slope value.

When the vertical constraint is expressed in vertical speed, the slope FPA_C of the representative symbol is obtained from the vertical speed VZ_C and the ground speed GSPD:

$$FPA\_C = ATAN\left(\frac{VZ\_C}{GSPD}\right) \quad (20)$$

Optionally, a step 89 for smoothing the slope values to be displayed is carried out.

If the computation frequency is high, the slope depiction of each constraint is filtered by a low pass filter before display, in order to make the display more fluid.

If the computation frequency is not high enough, the slope depiction of each constraint is interpolated to allow the display of intermediate values and make the display more fluid.

The method according to the described technology has been described for an application to a set of vertical constraints.

However, the number of vertical constraints may be high, and a simultaneous display of all of the constraints is not always advisable.

In one embodiment, it is considered to select the constraints to be displayed, prior to the display step.

Desirably, only two constraints are displayed at the same time, a minimum altitude constraint (ABOVE) and a maximum altitude constraint (BELOW).

The selection desirably seeks to show the highest priority constraints, those that are close in terms of distance or time to the position of the aircraft, and the most restrictive constraints, i.e., the constraints imposing the most restrictive slope limits.

Figure 8:
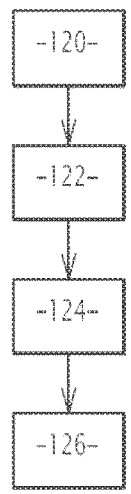
FIG. 8 is a flowchart illustrating the main steps for selecting vertical constraints to be displayed according to one embodiment of the described technology.

The main steps of such a selection algorithm in one embodiment are illustrated in the form of a flowchart in FIG. 8.

In this selection algorithm, three parameters are used: a distance or time parameter relative to the current position of the aircraft, a priority parameter relative to the source of the constraint, and a parameter representative of the slope associated with the constraint.

Beforehand, a priority value is associated with each vertical constraint source, the lowest priority value corresponding to the source with the highest priority.

For example, the following priority values are used: 0 for a land constraint, 20 for a traffic constraint, 40 for a procedural constraint, 60 for a flight plan constraint and 80 for a weather constraint.

For example, the parameter representative of the slope associated with the constraint is the slope value associated with the constraint for the BELOW constraints and opposite the slope value associated with the constraints for the ABOVE constraints.

The selection algorithm comprises a first step 120 for assigning a distance value Dc, a priority value Pc and a representative slope value Gc to each constraint, then a step 122 for selecting a cost function determining the proportion in which each parameter is taken into account. For example, the following cost function is used:

$$Fc(Dc,Pc,Gc)=\alpha*Dc+\beta*Pc+\gamma*Gc \quad (21)$$

With:
α and γ three coefficients of the cost function
Dc the horizontal distance from the constraint
Pc the priority value of the constraint
Gc the representative value of the slope associated with the constraint For β=γ0, only the distance parameter at the current position of the aircraft is taken into account, for α=γ=0, only the priority value is taken into account, and for α=γ=0, only the value representative of the slope associated with the constraint is taken into account.

Next, during a step 124, for each constraint, its cost is computed by applying the cost function defined by formula (21), and lastly, in step 126, the minimum altitude constraint (ABOVE) is selected having the lowest cost value from among all of the ABOVE constraints, and likewise, the maximum altitude constraint (BELOW), from among all of the BELOW constraints.

This method makes it possible to consider the three parameters: distance from the current position of the aircraft, priority relative to the source of the constraint, and slope associated with the constraint.

Alternatively, it is possible to use the time from the constraint rather than the distance therefrom. It is understood that any generalization to a large number of parameters can be considered, for example to take into account the time or the vertical deviation from the constraints.

Advantageously, a second selection can be done following the first in the case where the first leads to selecting an ABOVE constraint with an associated slope strictly greater than the slope associated with a BELOW constraint. Indeed, such a display is disruptive for the crew inasmuch as no guidance setpoint can satisfy both constraints at the same time. In this particular case, the second selection would consist of only keeping the constraint having the lowest cost value from among the two constraints. Alternatively, another cost function can be used for this second selection.

The description of the embodiments shows that when the constraint is expressed in altitude, the slope value of the depiction of the constraint is obtained as a mathematical formula based on at least two parameters from among the current altitude of the aircraft, the altitude of the constraint, the air speed, the ground speed, the vertical speed or the current slope.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A method for displaying vertical constraints of an aircraft during flight on a display device of the aircraft, the display device being part of an aircraft piloting system, the method being implemented by an electronic device that is part of the aircraft piloting system, the method comprising:
   acquiring, using a plurality of sensors, a plurality of flight parameters of the aircraft comprising a vertical speed of the aircraft, a ground speed of the aircraft, a current altitude of the aircraft, a current slope of the aircraft and an airspeed;
   acquiring at least one vertical constraint of the aircraft based on at least one of the acquired flight parameters;
   computing a representative slope value associated with the vertical constraint;
   displaying a symbol depicting the vertical constraint at the representative slope value associated with the vertical constraint on a slope scale, the slope scale comprising a one-dimensional scale of slope values;
   displaying, on the same slope scale, a symbol indicating the current slope or the current vertical speed of the aircraft, wherein the slope scale is a performance scale; and
   displaying the performance scale comprising a minimum slope value and a maximum slope value achievable by the aircraft, the minimum and maximum slope values being computed based on at least one performance characteristic of the aircraft, the computation of the representative slope value associated with the vertical constraint also depending on at least one performance characteristic of the aircraft.

2. The method according to claim 1, further comprising:
   displaying a current guidance setpoint of the aircraft, the current guidance setpoint being depicted with respect to the slope scale.

3. The method according to claim 1, wherein the vertical constraint is defined by an altitude, and wherein the representative slope value associated with the vertical constraint is obtained as a mathematical formula based on at least two parameters from among the altitude of the vertical constraint and the flight parameters of the aircraft.

4. The method according to claim 3, wherein the computing of the representative slope value associated with the vertical constraint comprises assessing a slope value of a tangent at a predetermined distance from the current position of the aircraft of a boundary trajectory, the boundary trajectory being a trajectory making it possible to meet the vertical constraint according to a predetermined satisfaction criterion.

5. The method according to claim 4, wherein the computation of the representative slope value takes into account a horizontal distance at a waypoint associated with the constraint, the horizontal distance being computed as a function of a lateral trajectory followed by the aircraft or as a function of a reference trajectory of the aircraft, or being the shortest horizontal distance from a zone where the constraint applies.

6. The method according to claim 1, further comprising computing a minimum performance trajectory and a maximum performance trajectory based on at least one performance characteristic of the aircraft, and wherein the computation of the representative slope value comprises determining whether the vertical constraint belongs to an achievable flight envelope defined by the minimum performance trajectory and maximum performance trajectory.

7. The method according to claim 6, wherein if the vertical constraint belongs to the achievable flight envelope, the representative slope value is a propagator setpoint value for at least one guidance mode from among a vertical speed control mode and a slope control mode of the aircraft, allowing the aircraft to respect the vertical constraint.

8. The method according to claim 6, wherein if the vertical constraint does not belong to the achievable flight envelope, the representative slope value is computed based on an extrapolated boundary trajectory of the aircraft.

9. The method according to claim 1, further comprising selecting a vertical constraint from among a minimum altitude, slope or vertical speed limit and a maximum altitude, slope or vertical speed limit, wherein for a vertical constraint, the depiction symbol is chosen so as to be representative of a type of vertical constraint from among a minimum limit and a maximum limit.

10. The method according to claim 1, wherein the depiction symbol has a shape representative of a vertical constraint source, and a size or opacity representative of the distance between the current position of the aircraft and a zone where the vertical constraint applies.

11. The method according to claim 1, further comprising selecting vertical constraints to be displayed, the selection taking into account at least one parameter from among a distance parameter of the aircraft from the vertical constraint, a priority parameter relative to a source of the vertical constraint, and a parameter representative of the slope associated with the vertical constraint.

12. A computer program product comprising software instructions which, when implemented by a computer, implement a method according to claim 1.

13. A system for displaying vertical constraints of an aircraft on a display device of the aircraft, the display device being part of an aircraft piloting system, the system comprising:
   a plurality of sensors configured to acquire a plurality of flight parameters of the aircraft comprising a vertical speed of the aircraft, a ground speed of the aircraft, a current altitude of the aircraft, a current slope of the aircraft and an airspeed;
   a processor configured to: i) acquire at least one vertical constraints of the aircraft based on at least one of the acquired flight parameters and ii) compute a representative slope value associated with the vertical constraint; and a display device configured to: i) display a symbol depicting the vertical constraint at the representative slope value associated with the vertical constraint on a slope scale, the slope scale comprising a one-dimensional scale of slope values, and ii) display, on the same slope scale, a symbol indicating the current slope or the current vertical speed of the aircraft, wherein the slope scale is a performance scale, the display device being further to display the performance scale comprising a minimum slope value and a maximum slope value achievable by the aircraft, and wherein the processor is further configured to compute the minimum and maximum slope values based on at least one performance characteristic of the aircraft, the computation of the representative slope value associated with the vertical constraint also depending on at least one performance characteristic of the aircraft.

14. An aircraft comprising a piloting system, wherein the piloting system includes a vertical constraint display system according to claim 13.

* * * * *